Oct. 4, 1927.

J. GUILLEMIN-TARAYRE 1,644,550

LOAD BRAKE EQUIPMENT

Filed March 15, 1926   2 Sheets-Sheet 1

INVENTOR
JEAN GUILLEMIN-TARAYRE
BY
ATTORNEY

Oct. 4, 1927.

J. GUILLEMIN-TARAYRE 1,644,550

LOAD BRAKE EQUIPMENT

Filed March 15, 1926

2 Sheets-Sheet 2

INVENTOR
JEAN GUILLEMIN-TARAYRE
BY *Wm. M. Cady*
ATTORNEY

Patented Oct. 4, 1927.

1,644,550

UNITED STATES PATENT OFFICE.

JEAN GUILLEMIN-TARAYRE, OF VILLEMOMBLE, FRANCE, ASSIGNOR TO THE WESTINGHOUSE AIR BRAKE COMPANY, OF WILMERDING, PENNSYLVANIA, A CORPORATION OF PENNSYLVANIA.

LOAD-BRAKE EQUIPMENT.

Application filed March 15, 1926, Serial No. 94,661, and in France April 21, 1925.

This invention relates to fluid pressure brakes, and more particularly to an empty and load brake apparatus.

It has heretofore been proposed to utilize two brake cylinders in an empty and load brake equipment, one for taking up the slack of the brake rigging and the other for applying the brake shoes to the car wheels, fluid being first supplied to the take-up brake cylinder by operation of the usual brake application valve and then to the load brake cylinder after a predetermined pressure has been obtained in the take-up brake cylinder.

The principal object of my invention is to provide a simplified and improved load brake apparatus of the above character.

Figure 1:
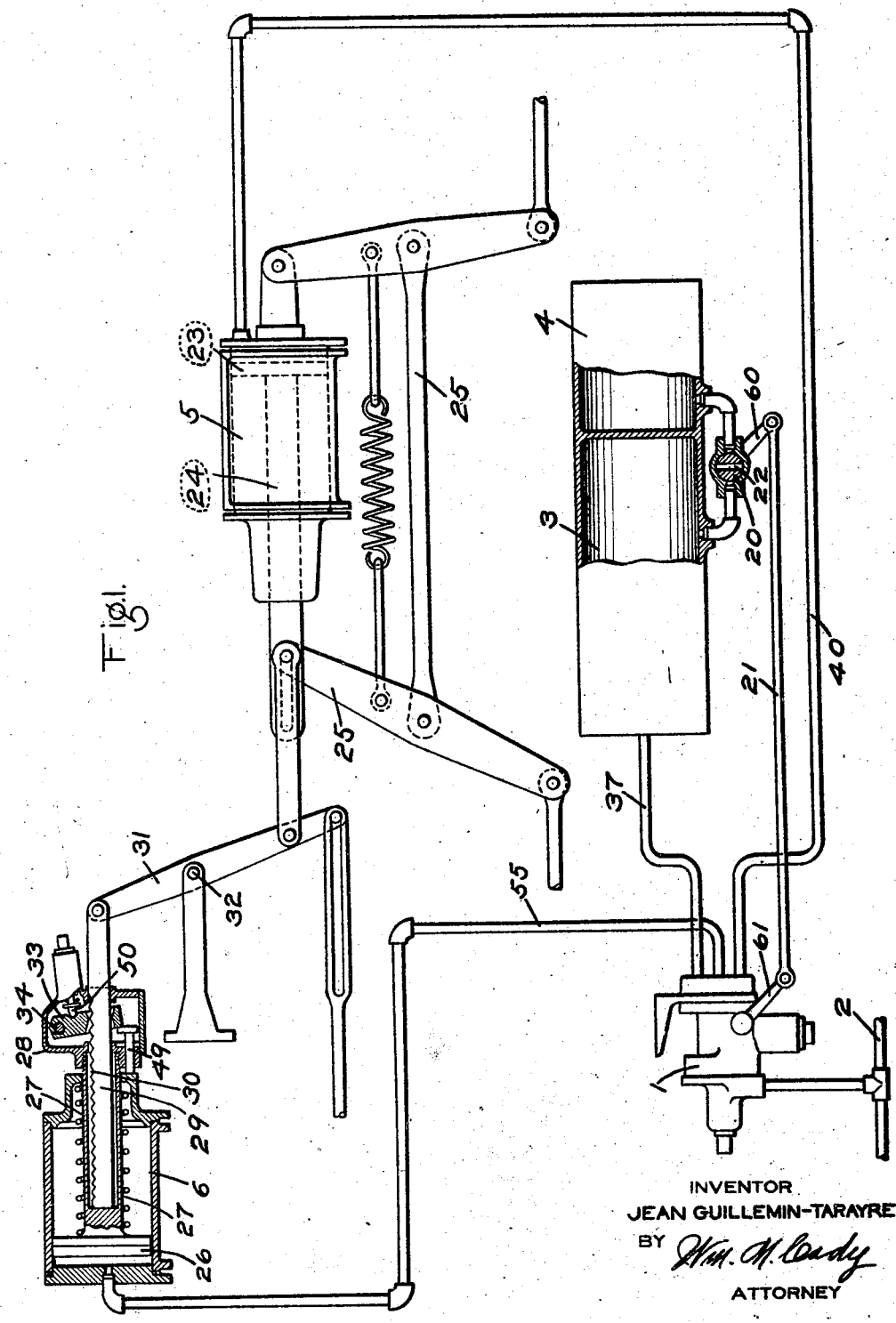
Figure 2:
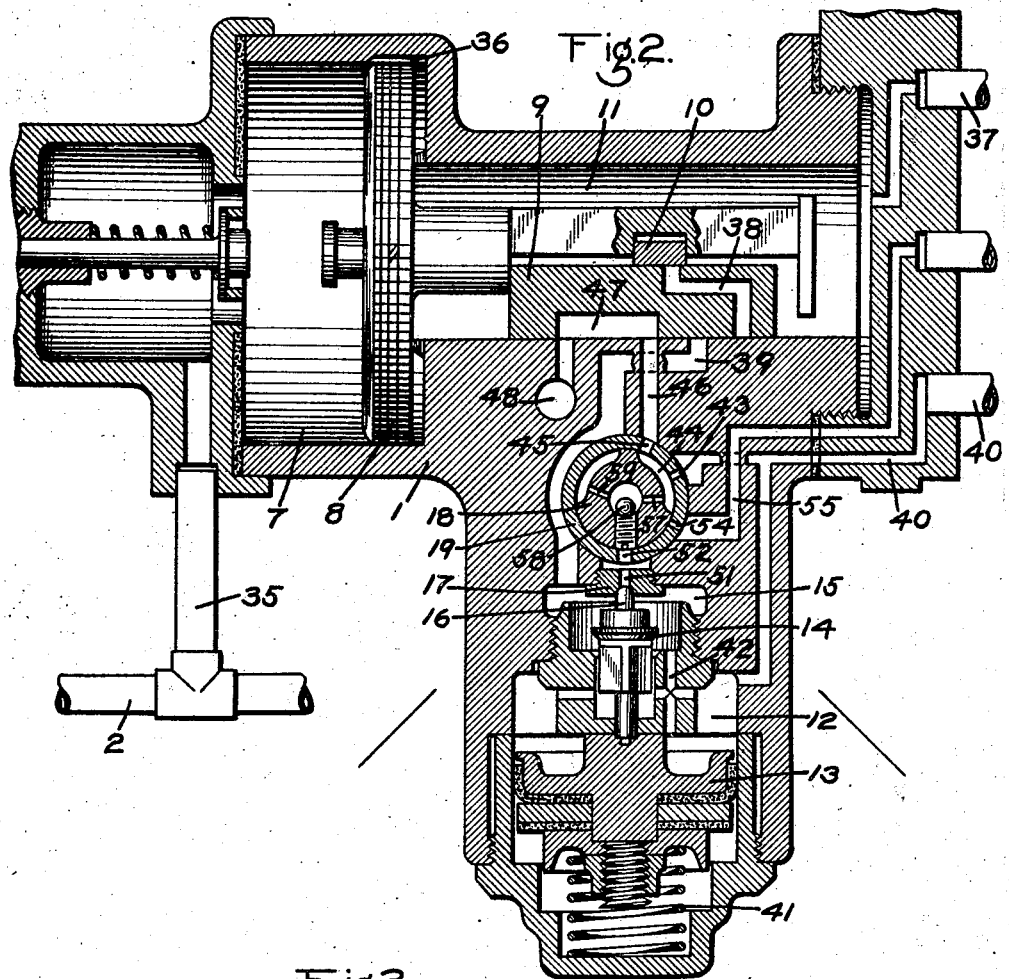

In the accompanying drawings, Fig. 1 is a diagrammatic view, partly in section, of load brake apparatus embodying my invention; Fig. 2 a vertical section of the triple valve device employed in the construction shown in Fig. 1; and Fig. 3 a fragmentary view, showing the controlling cock of the triple valve device in load braking position.

As shown in Fig. 1 of the drawings, the equipment may comprise a triple valve device 1 connected to the usual brake pipe 2, an auxiliary reservoir 3, a supplementary reservoir 4, a take-up brake cylinder 5, and a load brake cylinder 6.

As more clearly shown in Fig. 2, the triple valve device 1 may comprise a casing having a piston chamber 7 connected to the brake pipe 2 and containing a piston 8, which is adapted to operate a main slide valve 9 and a graduating slide valve 10 contained in valve chamber 11, said valve chamber being connected to the auxiliary reservoir 3.

Disposed in the triple valve casing is a piston chamber 12 containing a piston 13 subject on one side to the pressure of fluid supplied to piston chamber 12 and on the other side to the pressure of a coil spring 41, said piston being adapted to operate a valve 14 for controlling communication from a chamber 15 to piston chamber 12. Mounted on valve 14 is a pin valve 16, adapted, when valve 14 is unseated, to seat at 17 to cut off communication from chamber 15 to a passage 51.

Also contained in the triple valve casing is a two position plug valve 18, which may be mounted in a bushing 19 and is adapted in one position to establish communication from passage 51 to passage 55 leading to the load brake cylinder and in the other position to cut off said communication.

Referring now to Fig. 1, the auxiliary reservoir 3 and the supplemental reservoir 4 are adapted to be connected with each other through the operation of a two position plug valve 20 having an operating handle 60, which is connected by a rod 21 to a handle 61 operatively connected to the plug valve 18 contained in the triple valve device 1. The plug valve 20 is provided with a port 22 adapted in one position of the plug valve to establish communication between said reservoirs, and in the other position to cut off said communication.

The take-up brake cylinder 5 may be of the usual construction having a piston 23 connected by piston rod 24 to the usual brake rigging 25.

The load brake cylinder 6 contains a piston 26, having a sleeve member 27 to which is attached a locking mechanism 28, and movable in sleeve member 27 is a piston rod 29, provided with a plurality of notches 30, said piston rod being pivotally connected to a lever 31 which is connected at its other end to the brake rigging 25 and is fulcrumed at a point 32.

The locking mechanism 28 may comprise a casing containing a pawl 33 pivotally mounted on a pin 34 secured to the casing, said pawl being adapted to be held out of engagement with the notches 30 of piston rod 28, when piston 26 is in its innermost position, by a pin 49, which is interposed between the end of the brake cylinder 6 and the casing 28. When the piston 26 is moved out, the spring acts on the pawl 33 and forces same into engagement with the notches of the piston rod 29.

In operation, for empty or light car braking, the rod 21 is manually operated so that handles 61 and 60 shift the plug valves 18 and 20 to empty car position, as shown in Fig. 1, the plug valve 18 assuming the position shown in Fig. 2.

With the cocks 18 and 20 set for empty car braking when the system is charged, fluid under pressure from the brake pipe 2 flows through pipe 35 to piston chamber 7, thence through feed groove 36 to valve chamber 11 and through pipe 37 to auxiliary reservoir 3, charging the same. The supplementary reservoir 4 will not be charged, since communication from auxiliary reservior 3 is cut off by plug valve 20.

When it is desired to effect a service application of the brakes, the pressure in brake pipe 2 and consequently in piston chamber 7 of triple valve device 1 is reduced in the usual way, permitting the higher pressure in valve chamber 11 acting on the opposite side of piston 8 to shift said piston, graduating slide valve 10 and main slide valve 9 to service position. With said slide valves in this position, fluid under pressure from valve chamber 11 and auxiliary reservoir 3 flows through port 38 in slide valve 9, to passage 39 and chamber 15, thence past unseated valve 14 to piston chamber 12 and through passage and pipe 40 to the empty car brake cylinder 5.

When the pressure of fluid in the brake cylinder 5 and in piston chamber 12 has been increased to a degree slightly exceeding the pressure exerted on the opposite side of piston 13 by spring 41, which is approximately the pressure required to take up the slack of the brake rigging, the piston 13 will be shifted so as to permit the valve 14 to seat. Fluid from chamber 15 and the auxiliary reservoir can then flow to the brake cylinder only through a restricted port 42.

When it is desired to release the brakes, the brake pipe pressure is increased in the usual way, causing piston 8, slide valve 9, and graduating slide valve 10 to be shifted to release position. Fluid from brake cylinder 5 then flows through pipe and passage 40, port 43 in bushing 19, cavity 44 in plug valve 18, port 45 in bushing 19, passage 46, cavity 47 in slide valve 9, and atmospheric exhaust port 48.

Figure 3:
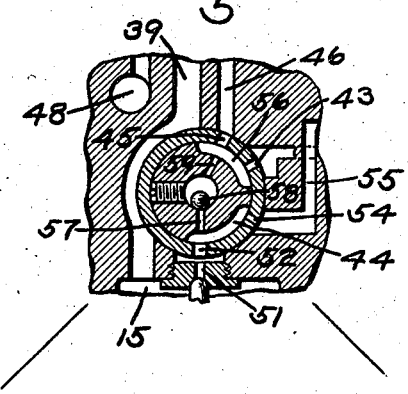

When it is desired to cut in the load brake cylinder, the rod 21 is shifted so that the plug valve 18 will be rotated to its load position, as shown in Fig. 3 of the drawings, and plug valve 20 will be rotated to the position in which port 22 establishes communication from the auxiliary reservoir 3 to supplementary reservoir 4, thereby permitting said supplementary reservoir to be charged at the same time the auxiliary reservoir is charged from the brake pipe.

When a service application of the brakes is effected with the parts set for load braking, fluid under pressure from valve chamber 11, auxiliary reservoir 3, and supplementary reservior 4, flows to the take-up brake cylinder 5 in the same manner as in a service application on an empty car, as hereinbefore described, but when the valve 14 is seated by movement of piston 13, the unseating of valve 16 permits the flow of fluid from chamber 15 through passage 51, port 52 in bushing 19, cavity 44 in plug valve 18, port 54 in bushing 19 and passage and pipe 55 to load brake cylinder 6.

The pressure of fluid so supplied to brake cylinder 6 causes piston 26 to move out and the initial movement thereof disengages pin 49 from cylinder 6, so that spring stem 50 moves pawl 33 into engagement with one of notches 30, whereby the pressure of fluid supplied to the piston 26 is transmitted through the piston rod 29 and the lever 31 to the brake rigging 25, the slack of the brake rigging having been taken up and the piston rod 29 having been pulled out of the sleeve 27 to an extent corresponding with the movement of the brake rigging 25 and the lever 31, by the operation of the empty car brake cylinder piston 23.

In releasing the brakes after a load brake service application, fluid from take-up brake cylinder 5 flows to atmosphere through pipe and passage 40, port 43 in bushing 19, cavity 56 in plug valve 18, port 45 in bushing 19, passage 46, cavity 47 in slide valve 9 and atmospheric exhaust port 48. Fluid from load brake cylinder 6 flows through pipe and passage 55, port 54 in bushing 19, cavity 44, and port 57 in plug valve 18, raising ball check 58, and continuing through port 59, cavity 56, port 45, passage 46, cavity 47 and atmospheric exhaust port 48.

The relative areas of the ports 42 and 52 are such that the time required to effect a light car brake application by flow through port 42 will be the same as the time required to effect a loaded car brake application by flow through port 52. Also, the relative areas of the ports 45 and 43 are such that the time of release from both brake cylinders by way of port 45 will be the same as the time of release from the empty brake cylinder by way of port 43.

It will now be seen that I have utilized the action of a two stage triple valve device for effecting the charging of the load brake cylinder when the apparatus is being operated to provide for a loaded car.

Having now described my invention, what I claim as new and desire to secure by Letters Patent, is:—

1. In a load brake apparatus, the combination with two brake cylinders, of a valve device operated upon a predetermined increase in the pressure of fluid supplied to one brake cylinder for cutting off a communication through which fluid is supplied to said brake cylinder and means operated upon movement of said valve device to cut off said communication for opening a communication through which fluid under pressure is supplied to the other brake cylinder.

2. In a load brake apparatus, the combination with two brake cylinders, of a valve for controlling a communication through which fluid under pressure is supplied to one brake cylinder, means for operating said valve to close said communication upon a predetermined increase in pressure in said brake cylinder, and a valve operated upon the movement of the first valve to close said communication for opening a communication through which fluid under pressure is supplied to the other brake cylinder.

3. In a load brake apparatus, the combination with an empty brake cylinder and a load brake cylinder, of a valve for supplying fluid under pressure to the empty brake cylinder, means operated upon a predetermined increase in pressure of fluid supplied to the empty brake cylinder for effecting the closure of said valve, and a valve operated by the movement of the first valve for opening a communication through which fluid under pressure is supplied to the load brake cylinder.

In testimony whereof I have hereunto set my hand.

JEAN GUILLEMIN-TARAYRE.